US012704908B2

(12) United States Patent
Kapila et al.

(10) Patent No.: US 12,704,908 B2
(45) Date of Patent: Aug. 11, 2026

(54) SWITCHABLE CONVERSION OF A STANDARD KEYBOARD TO A BRAILLE INTERFACE

(71) Applicant: Intel Corporation, Santa Clara, CA (US)

(72) Inventors: Smit Kapila, Bangalore (IN); Prakash Kurma Raju, Bangalore (IN); Naveen Kumar, Bangalore (IN); Santosh Gangal, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/071,998

(22) Filed: Nov. 30, 2022

(65) Prior Publication Data

US 2023/0087586 A1 Mar. 23, 2023

(51) Int. Cl.

*G06F 1/16* (2006.01)
*G06F 3/02* (2006.01)
*G06F 3/023* (2006.01)
*G09B 21/02* (2006.01)
*H01H 13/84* (2006.01)

(52) U.S. Cl.
CPC .......... *G06F 3/0238* (2013.01); *G06F 3/0219* (2013.01); *G09B 21/025* (2013.01)

(58) Field of Classification Search
None
See application file for complete search history.

(56) References Cited

U.S. PATENT DOCUMENTS

2003/0132915 A1* 7/2003 Mitchell ............... G06F 3/0238 345/168
2014/0176445 A1* 6/2014 Stonefield ........... G06F 3/04895 345/168
2019/0326081 A1* 10/2019 Kurma Raju .......... H01H 13/84

* cited by examiner

*Primary Examiner* — Carl Adams
(74) *Attorney, Agent, or Firm* — Banner & Witcoff, Ltd.

(57) ABSTRACT

Keyboards that are selectably configurable between a standard interface and a braille interface. In embodiments, the keyboard is equipped with six keys corresponding to six dots of a braille matrix, each of the keys equipped with a shape memory alloy spring or other mechanism to cause each of the keys to selectably extend above the keyboard plane. On activation, the six keys are extended and the remaining keys deactivated, to provide an easy to locate braille interface. On subsequent activation, the six keys are retracted and the keyboard is reverted to a standard interface. Other embodiments may be described and/or claimed.

16 Claims, 7 Drawing Sheets

NON-TRANSITORY COMPUTER-READABLE STORAGE MEDIUM
1602

PROGRAMMING INSTRUCTIONS 1604,
CONFIGURED TO CAUSE A DEVICE, IN RESPONSE TO EXECUTION OF THE PROGRAMMING INSTRUCTIONS, TO PRACTICE (ASPECTS OF) EMBODIMENTS OF THE PROCESS(ES) DESCRIBED THROUGHOUT THIS DISCLOSURE.

SWITCHABLE CONVERSION OF A STANDARD KEYBOARD TO A BRAILLE INTERFACE

TECHNICAL FIELD

Disclosed embodiments are directed to braille interfaces, and specifically to methods and systems for selectively converting a standard keyboard to a braille interface and back.

BACKGROUND

By default, computing devices are designed around and equipped with interfaces that are most easily used by people with normal vision (corrected or uncorrected). To facilitate usage of computing devices, various techniques have been developed to help assist with sight-impaired usage. For example, many operating systems include screen readers, where text elements displayed on the operating system interface are read aloud. For inputting data, tactile keyboards, viz. keyboards equipped with individual keys for letters, are often equipped with tactile indicators of "home" keys, such as the letters F and J, and so may be used by vision impaired persons following some training. As an alternative, vision-impaired persons may be able to input text using the braille system, where characters are represented in a 2×3 dot matrix, and thus requiring only six discrete keys for text entry.

The background description provided herein is for the purpose of generally presenting the context of the disclosure. Unless otherwise indicated herein, the materials described in this section are not prior art to the claims in this application and are not admitted to be prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
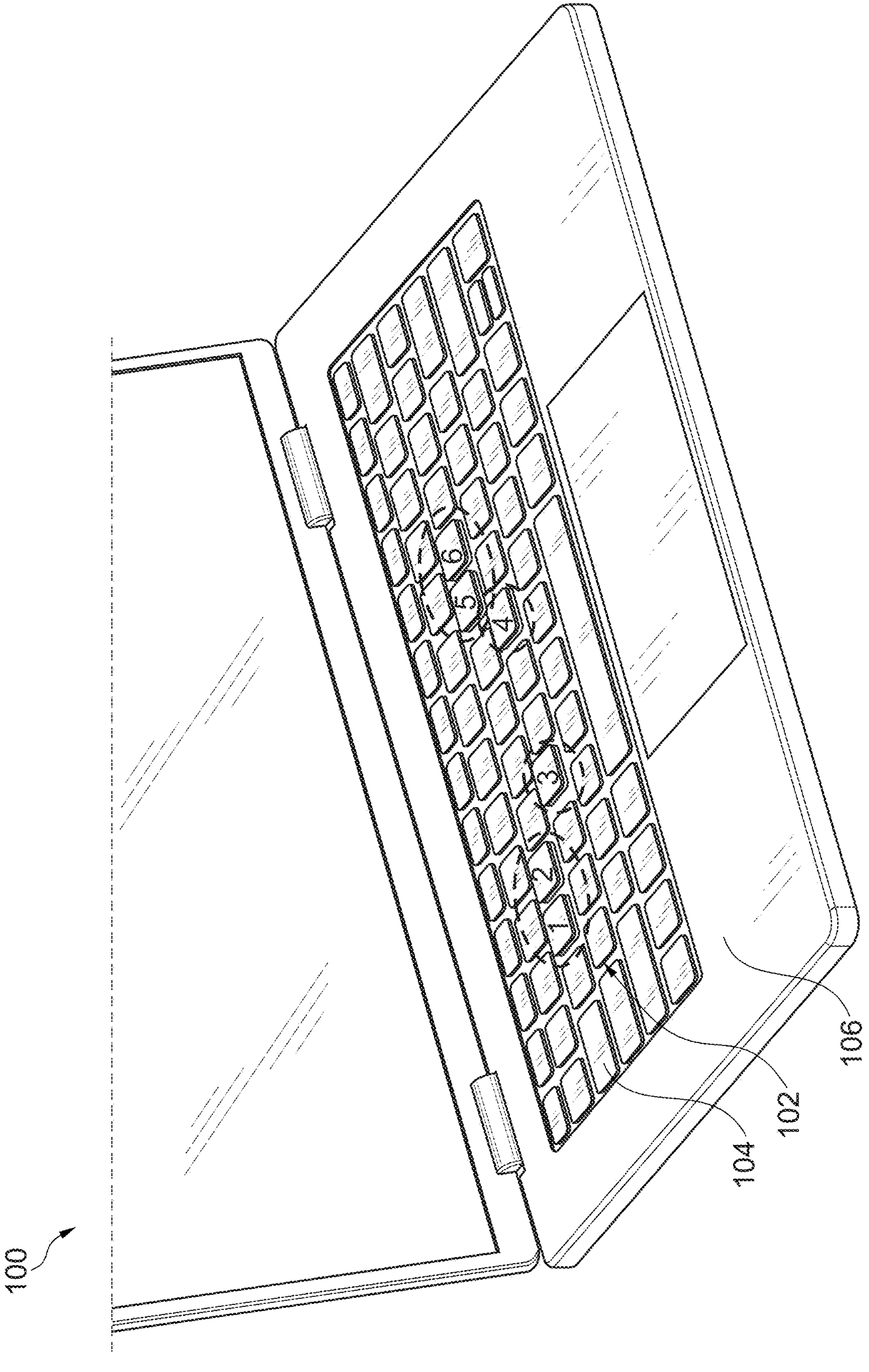
FIG. 1 illustrates a laptop computer with an example keyboard with six raised keys for a braille interface, according to various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The braille writing system is a tactile alphabet for the sight-impaired comprised of characters formed from a plurality of raised dots. A sight-impaired reader reads braille by lightly placing their fingers on the characters in sequence, enabling them to read words by feeling each individual character. Each character is formed from a 2×3 matrix of dots, with two columns of three dots each, with a unique pattern assigned to each character of the alphabet. As the 2×3 braille matrix only requires six dots, braille characters can be typed using three fingers on two hands, with the hands held in relatively static locations on a suitable interface. Interfaces designed specifically for braille input are available, but typically must be used with a computer device, such as computer device 1500 (FIG. 6, discussed below) that can accept accessories, e.g. a computer equipped with a USB port or similar interface. However, this requires that the user carry the interface with them. Alternatively, a conventional mechanical keyboard (in contrast to a virtual or touch-screen based keyboard) can serve as a braille interface. Conventional keyboards have the benefit of being tactile, as a user can feel the edges of the individual keys, and most keyboards include tactile markers on the "home"

keys of F and J, to allow a user to position their hands without looking down from the screen. Thus, a conventional keyboard can be converted to a braille interface with relative ease.

However, between different users, hand positions and finger positions may vary due to differences in hand size, finger length, and other body metrics. Consequently, when left and right index fingers are placed on the F and J keys, respectively, the middle and ring fingers of each hand may fall on different keys depending on the user. For vision-impaired users, this may necessitate a calibration procedure for each user to determine where each different user has placed their hands before employing a keyboard as a braille interface.

Disclosed embodiments include a keyboard with a plurality of keys that can be toggled between two different heights, so that they can be arranged to stand proud above the plane of keys defined by most keyboards. The keys thus are easy to tactilely locate by a vision-impaired user within a keyboard array. In embodiments, six keys are equipped to change height. When activated, the six keys form a braille interface above the keyboard plane is readily located by a vision-impaired user, and so do not require a calibration procedure. As will be discussed below, the remaining keys that do not change height and remain in the keyboard plane may be disabled to prevent accidental activation.

FIG. 1 illustrates an example interface 100, according to some embodiments. Interface 100 includes a plurality of raised keys 102, located within a keyboard array 104. As can be seen the raised keys 102 rise above a plane defined by the keyboard array 104, and so are easily located by touch. The keyboard array 104 is installed into the base of a laptop 106, which forms a substrate from which the keyboard array 104 protrudes. The raised keys 102 in turn extend above the keyboard array 104. In the depicted embodiment, there are six raised keys 102, which are arranged to form a braille interface in two groups of three keys. These groups correspond to the 2×3 braille matrix, with the keys for each hand corresponding to the dots in one of the columns. A user would position their left and right hands to respectively contact one of the two groups of raised keys 102, with the index, middle, and ring fingers of each hand typically being used to each contact a key. Laptop 106 may be a computer device such as computer device 1500 (FIG. 6), with a built-in keyboard. In other embodiments, the keyboard array 104 may be equipped to an external keyboard, such as may be used with a desktop computer or a docking station.

Figure 2:
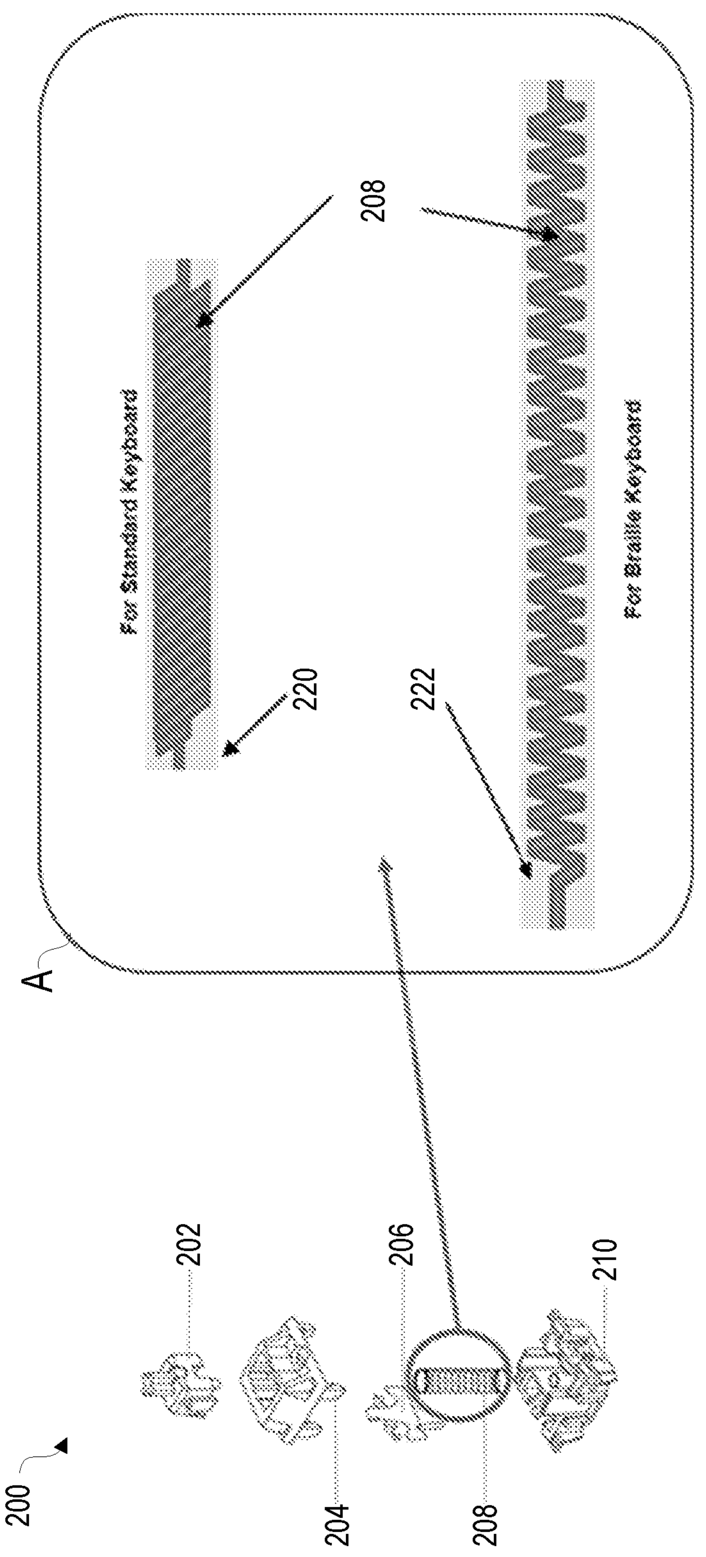
FIG. 2 illustrates the components of a key with an adjustable height mechanism that may be used with a keyboard such as the example of FIG. 1, according to various embodiments.

FIG. 2 illustrates an example mechanism 200 that may be used to cause a key, such as one of the raised keys 102, to increase in height above the plane of a keyboard array. Mechanism 200 includes a stem 202, an upper housing 204, a crosspoint contact 206, a coil spring 208, and a bottom housing 210. The stem 202 includes a protrusion upon which a key cap (not shown) is placed, the key cap being contacted by the user and including the key's markings. Alternatively or additionally, the key cap may rest upon the upper housing 204. Depending on the design of the mechanism 200, either or both of the stem 202 and/or upper housing 204 moves downwards towards the bottom housing 210 when the user depresses the key. The coil spring 208 provides resistance against the user's stroke, and causes the stem 202 and/or upper housing 204, and key cap, to return to an undepressed position.

Coil spring 208, in embodiments, can control the height of stem 202 in an undepressed position. Consequently, by making coil spring 208 adjustable in height, the height of stem 202 (and any attached key cap) can likewise be made adjustable. This is illustrated in Inset A of FIG. 2, where coil spring 208 can toggle between two lengths. A first length 220 may be selected when the key is acting as part of a standard keyboard array, and so should be held flush with the plane defined by the keyboard array's keys. A second length 222 may be selected when the key is acting as part of a braille interface, and so should stand proud above the plane of the keyboard array. As will be understood, the greater length of second length 222 will cause the stem 202 and/or upper housing 204 to be pushed above the plane of a keyboard array into which mechanism 200 is installed, with the shorter length of first length 220 approximately corresponding to the spring length in the other switch mechanisms of the keyboard array, placing the key within the plane of the keyboard array.

The length of coil spring 208 may be toggled by any suitable mechanism. In some embodiments, coil spring 208 may be manufactured or fabricated from a shape memory alloy (SMA). Shape memory alloys, as will be understood by a person skilled in the relevant art, are materials that are normally in a first shape or configuration, but that can switch to a second shape or configuration when heated. When heated again, the SMA can be moved back into its first configuration. Thus, through selective application of heat the SMA can toggle between two configurations. In the depicted embodiment, the coil spring 208 is fabricated from an SMA that is trained to toggle between first length 220 and second length 222 when selectively heated. This allows the height of the mechanism 200 using coil spring 208 to be toggled between a height in line with the plane of a keyboard array, and a taller height to form a braille interface.

Depending on the configuration of the various components of mechanism 200, viz. stem 202, upper housing 204, crosspoint contact 206, and/or bottom housing 210, one or more of the components may need to be modified to accommodate the adjustable height. The upper housing 204 may have stops that limit the upper travel of the stem 202, necessitating modification of the upper housing 204 and/or stem 202 to allow the stem 202 to travel a greater distance when placed into a braille interface configuration. In another possible implementation, the SMA or other height adjusting mechanism may be disposed below bottom housing 210, such as part of the support structure that secures the key mechanism 200 to a substrate. The SMA or height adjusting mechanism would then lift the entire mechanism 200, which could be implemented as a standard non-adjusting mechanism.

Further, it should be understood that mechanism 200 is only one possible implementation of an adjustable height key. Other mechanisms may be adapted to allow for an adjustable height. For example, scissors-style or butterfly-style mechanisms may be equipped with one or more components fabricated from a SMA that allows for selective height adjustment. It should also be understood that the component(s) may not be a spring, but may be another component or components that can be configured to adjust the height of the key, such as beneath the bottom housing 210, as discussed above. In still other embodiments, one of the other structures, e.g. upper housing 204, stem 202, or another component, may be configured with a SMA component or other actuator to effect changing the key's height.

While the depicted embodiments employ a spring 208 manufactured from a SMA, other actuator technology may be employed, which may not require a SMA. Some possible technologies could include magnets, solenoids, motors, pneumatic actuators, or any other suitable technology that can be used to toggle mechanism 200 between first and second heights.

Figure 3:
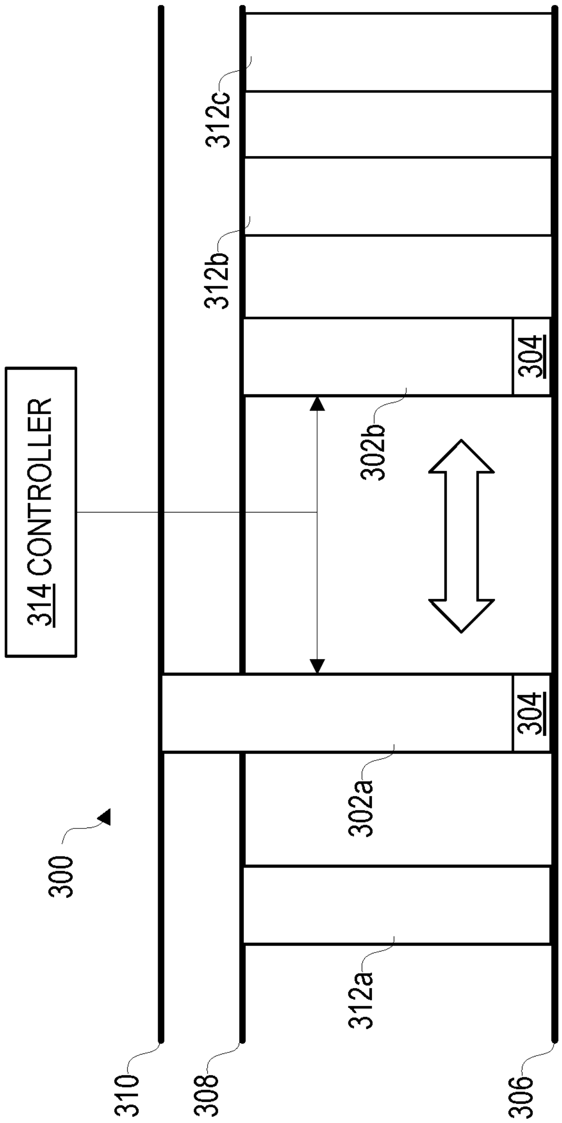
FIG. 3 is a cross-sectional view of keys such as the example adjustable height key of FIG. 2 in comparison with a key found on a typical keyboard, according to various embodiments.

FIG. 3 illustrates in profile the height differences of an example keyboard 300 resulting from actuation of the spring 208 in mechanism 200, to cause it to extend from the first length 220 to the second length 222. Keyboard 300 includes a substrate 306 to which a plurality of keys 302, 312*a*-312*c* are secured; it should be understood that the number of keys depicted is not representative of any particular keyboard, and most keyboards will have substantially more keys. The plurality of keys 312*a*-312*c* forms a first plane 308 above the plane of the substrate 306.

Key 302 is equipped with a mechanism that allows its height to be adjusted between first and second heights, similar to mechanism 200 (FIG. 2). FIG. 3 illustrates key 302 in both normal (302*b*) and an extended (302*a*) height for a braille interface. When in its extended 302*a* height, the key 302 extends to form a second plane 310 that is parallel to, but above, first plane 308. It is likewise parallel to the plane of the substrate 306, but higher above substrate 306 than first plane 308. This extension to second plane 310 allows key 302 to be readily located when in its extended 302*a* height from the remaining non-extended keys, such as keys 312*a*-312*c*. When in its normal 302*b* height, key 302 is within the first plane 308, and so acts as one of the non-extended keys 312*a*-312*c* as part of the keyboard array. It should be understood that key 302 may be any suitable key within the keyboard array, such as one of the letter keys, number key, or any other key. Key 302 thus serves dual functions, acting both as a regular letter when the keyboard is in a standard configuration, or as one of the dots of a 2×3 braille matrix when the keyboard is in a braille interface configuration.

Because the SMA of coil spring 208 can be toggled between lengths by the application of heat, it can be selectively toggled by a computer system by use of a controller and electrical heating. With respect to FIG. 3, a controller 314 is depicted in connection with key 302. The controller 314 may provide, or cause to be provided, electricity to a heating element or other heating means within the mechanism of key 302, to cause the SMA of its coil spring (or other structure) to switch between a normal length and an extended length, to toggle the key 302 between its normal 302*b* and extended 302*a* heights, respectively.

The means used to heat the SMA may vary. In one possible embodiment, an external heating element such as a resistor or thermistor may be positioned proximate to at least a portion of the spring to impart heat to cause the SMA to toggle lengths. In another possible embodiment, inductive heating may be employed. In still another possible embodiment, a current may be passed through the spring itself to cause direct heating from the SMA's natural resistance. In any such embodiments, the controller 314 may direct, or cause to be directed, current to the appropriate heating mechanism. Depending on the specifics of a given implementation, the controller 314 may directly supply the current, or may control power handling circuitry to deliver the necessary current. In embodiments that do not employ a SMA, the controller 314 may supply current or otherwise control another type of actuator or actuating mechanism to cause the key 302 to toggle between normal 302*b* and extended 302*a* heights.

Also visible in FIG. 3 in key 302 is a magnet 304. Magnet 304 may be present in some embodiments to participate in toggling of the key 302 between the extended 302*a* and normal 302*b* lengths. Controller 104 may cause a current to be passed through the spring in a first direction, setting up a magnetic field that is repelled by magnet 304, thus aiding in the spring moving key 302 to its extended 302*a* height. When the key 302 is to return to its normal 302*b* height, controller 104 may cause the current to pass through the spring in a second direction that is opposite from the first direction. As a result, the field is attracted to the magnet 304, and thus aids in the spring moving key 302 to its normal 302*b* height. It should be understood that the magnet and current arrangement is one possible embodiment; other embodiments may effect toggling between the extended 302*a* and normal 302*b* heights using other mechanisms.

Controller 304 may be implemented using discrete electronics, via one or more integrated circuits, or a combination of both. In some embodiments, controller 304 may be part of a keyboard controller or other circuitry for a computer device 1500 (FIG. 6), or may be a separate or standalone component. In some embodiments, some or all of the functionality of controller 304 may be provided by software instructions that are executable by a processor.

Figure 4:
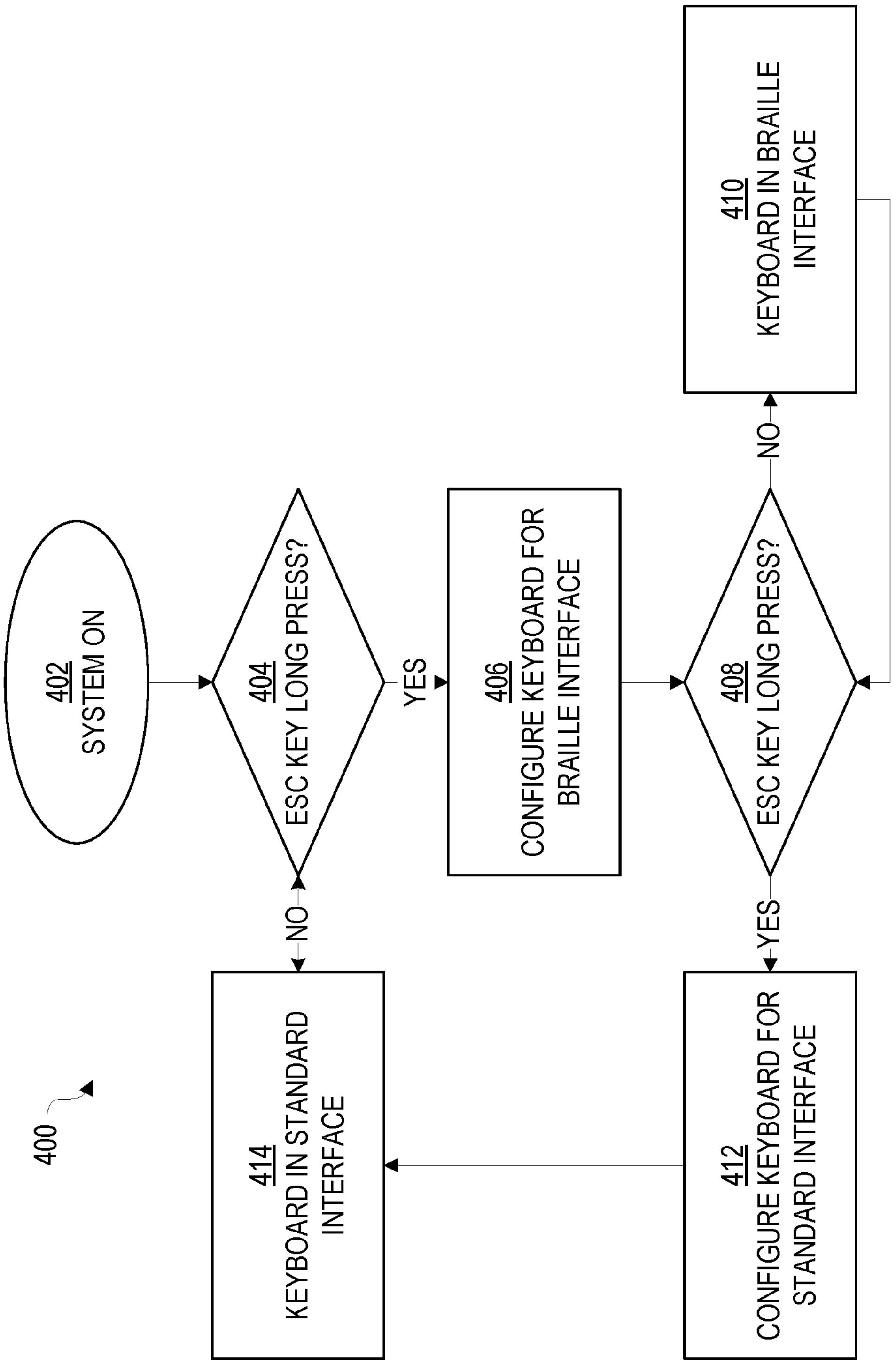
FIG. 4 is a flowchart of example operations to toggle between a braille interface and a standard keyboard interface, according to various embodiments.

Turning to FIG. 4, a flowchart of the operations of an example method 400 for toggling between standard keyboard and braille interfaces is illustrated, according to embodiments. Depending on the needs and specifics of a given implementation, each of the operations of method 400 may be performed in whole or in part, and some operations may be added or omitted.

In operation 402, the implementing system, such as a computer device 1500 (FIG. 6), is powered on and resets the keyboard to a default or standard interface, where the keyboard acts as a conventional keyboard with all keys enabled, as appropriate.

In operation 404, the Escape key, or another designated trigger key, is monitored for a long press, e.g. the key is pressed for at least a predetermined length of time. So long as a long press is not detected, the keyboard remains in a standard interface, indicated by the "NO" path leading to operation 414. Method 400 essentially stays in a loop between operation 404 and operation 414 until a long press is detected. While a long press is indicated as the trigger for operation 404, other embodiments may use a different trigger, e.g. a dedicated interface button be provided that simply must be depressed, or the Escape key or another designated key or combination of keys may be depressed in a certain pattern or a certain number of times, e.g. depressing the Escape key five times within the span of a second or two may trigger a "YES" from operation 404. It should be understood that any suitable pattern or mechanism for detecting a request for a braille interface may be employed, with consideration given to being readily accessible for a visually impaired person.

In operation 406, once a long key press or other designated trigger is detected (the "YES" path from operation 414), the keyboard is reconfigured for a braille interface. This reconfiguring may involve activation of any SMA springs or other mechanisms to cause six keys corresponding to the dots of the 2×3 braille matrix to extend above the plane of the keyboard, to be tactilely located. The remaining keys may be disabled, in some embodiments.

In operation 408, following reconfiguration to a braille interface, the Escape key or other designated trigger key is again monitored for a long press or other designated signal. If none is detected (the "NO" path), the keyboard remains in a braille interface configuration in operation 410. As with operations 404 and 414, operations 408 and 410 essentially form an endless loop with the keyboard remaining in a braille interface configuration until the trigger signal is received, leading to the "YES" path.

In operation 412, if a trigger is received and the “YES” path followed, the keyboard is reconfigured to a standard interface. The SMA springs or other mechanisms may be reactivated, and causes to withdraw the six keys corresponding to the braille matrix back flush with the plane of the keyboard. The remaining keys of the keyboard may be re-enabled, if previously disabled. The trigger to switch back to the regular interface may be the same as the trigger used to switch to the braille interface, or may be different, depending on the needs of a given embodiment.

In operation 414, finally, the method 400 returns to the initial loop, with keeping the keyboard in a standard interface configuration for as long as another long key press or other trigger is not received. The method 400 thus again awaits between operations 414 and 404 for a trigger indicating that the keyboard is to be again placed into a braille interface configuration.

Figure 5:
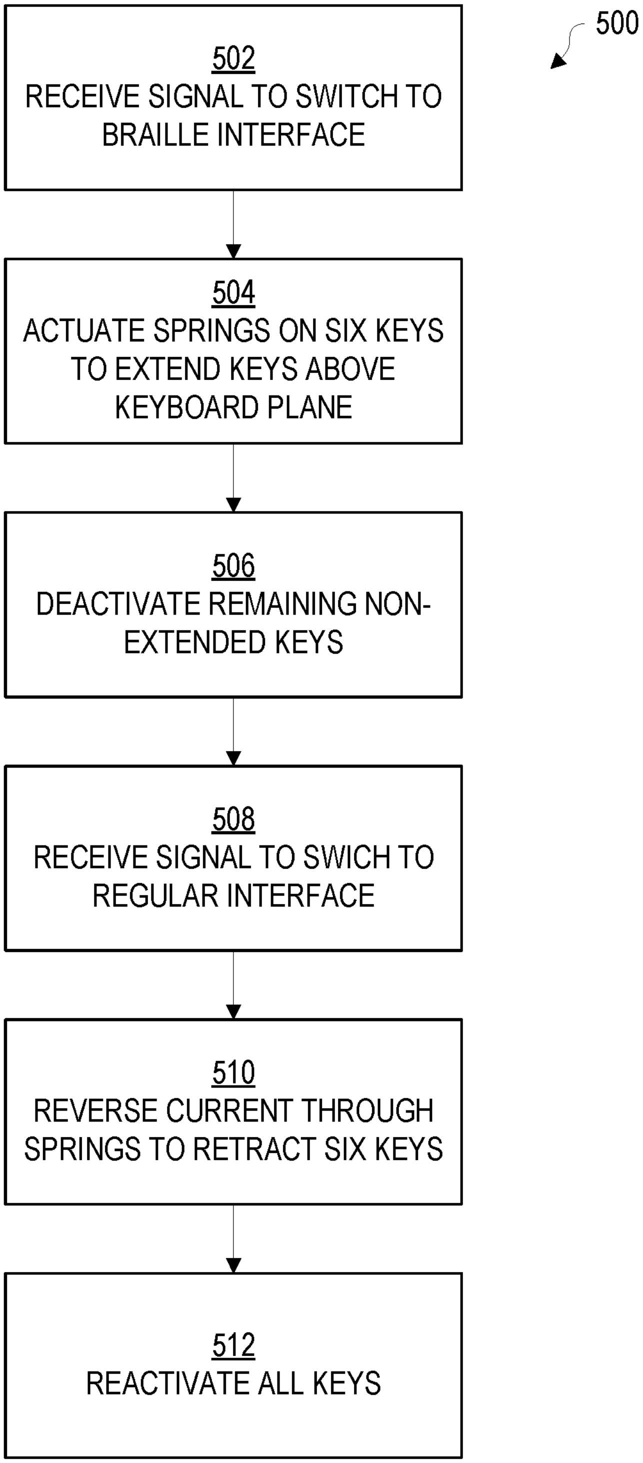
FIG. 5 is a flowchart of example operations to extend and retract keys of a keyboard to create a braille interface, according to various embodiments.

FIG. 5 depicts an example method 500 for converting a standard keyboard equipped with selectable height keys to a braille keyboard, according to some embodiments. Depending on the needs and specifics of a given implementation, each of the operations of method 500 may be performed in whole or in part, and some operations may be added or omitted.

In operation 502, a signal to switch to a braille interface is received. The signal may be any suitable signal, according to embodiments, such as a long key press as described above with respect to operations 404 and 408 of method 400.

In operation 504, in response to receiving the signal, the springs or other mechanisms are actuated on six keys that will form the braille interface, to cause them to extend above the plane of the keyboard. The springs or other mechanisms may be actuated by a controller, such as controller 314 (FIG. 3), or another suitable device. As described above, the mechanism may be actuated by causing a spring made from a SMA to be heated, and, depending upon the implementation, possibly extended with assistance from a magnet. A current may be run through the spring to cause the magnet to be repelled by the spring, providing an upward or extending force.

In operation 506, once the six braille interface keys have been extended, the remaining keys of the keyboard may be deactivated, in embodiments, to prevent accidental entry of characters and/or to reduce processing load. The six extended keys are remapped from their normal use to the six respective dots of the 2×3 braille matrix.

In operation 508, a signal to switch to the regular keyboard interface is received. As with operation 502, the signal may be any suitable signal, according to embodiments, such as described above with respect to operations 404 and 408 of method 400.

In operation 510, in response to receiving the signal, the springs or other mechanisms are again actuated on the six keys forming the braille interface, to cause them to retract back even with the plane of the keyboard. As with operation 504, the springs or other mechanisms may be actuated by the controller or another suitable device. A magnet again may be used to pull each of the keys back down to the plane of the keyboard, potentially while a SMA spring or other mechanism is heated. Current may be run through the spring in a reverse direction from operation 504, to cause the magnet to be attracted to the spring and provide a downward or retracting force.

In operation 512, all keys of the keyboard are again reactivated, with the keys previously mapped to the braille matrix dots being remapped to their usual functions in a normal keyboard interface.

Figure 6:
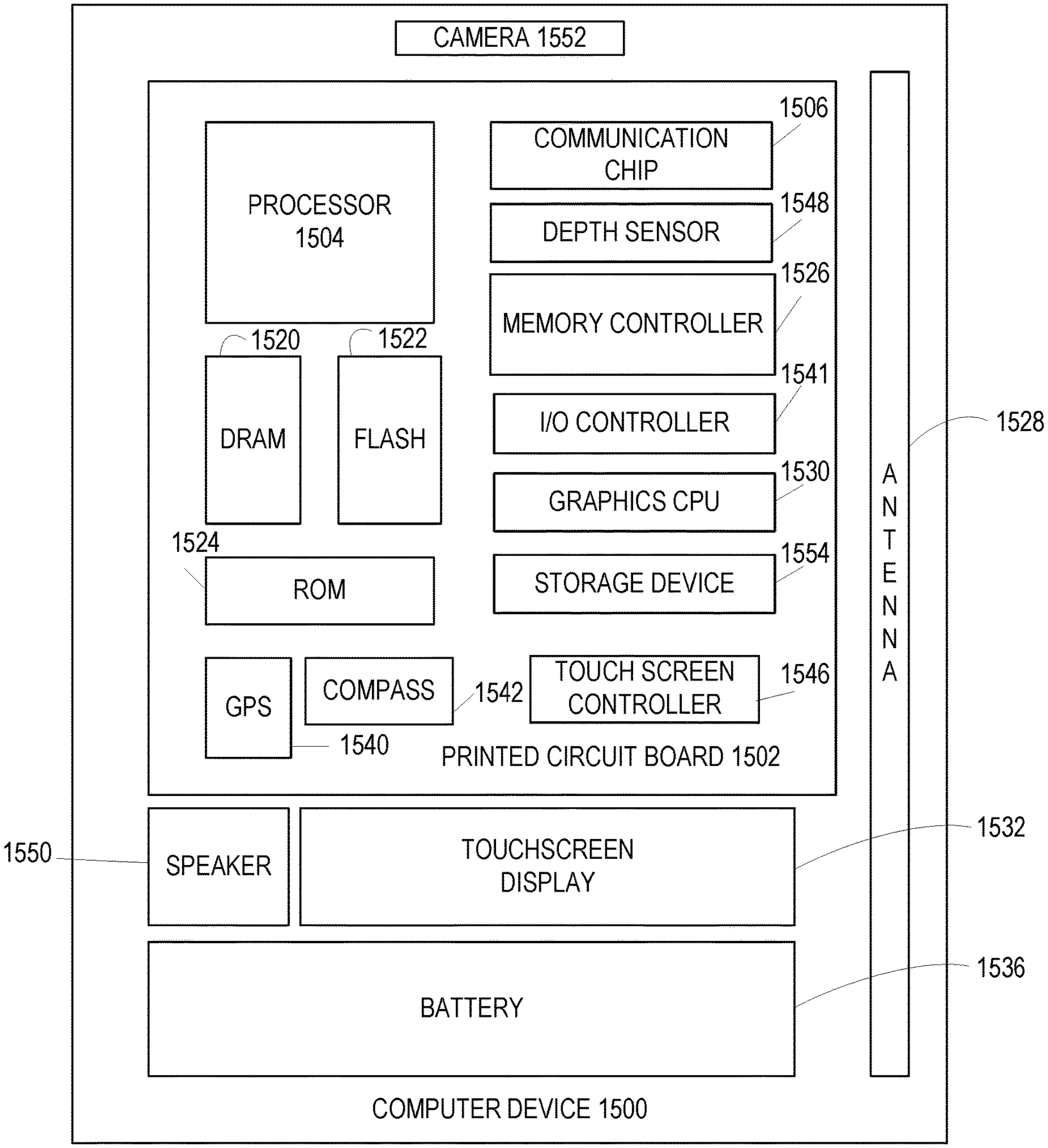
FIG. 6 is a block diagram of an example computer that can be used to implement some or all of the components of the disclosed systems and methods, according to various embodiments.

FIG. 6 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a depth sensor 1548, a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of method 400 or 500 described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term “wireless” and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 7:
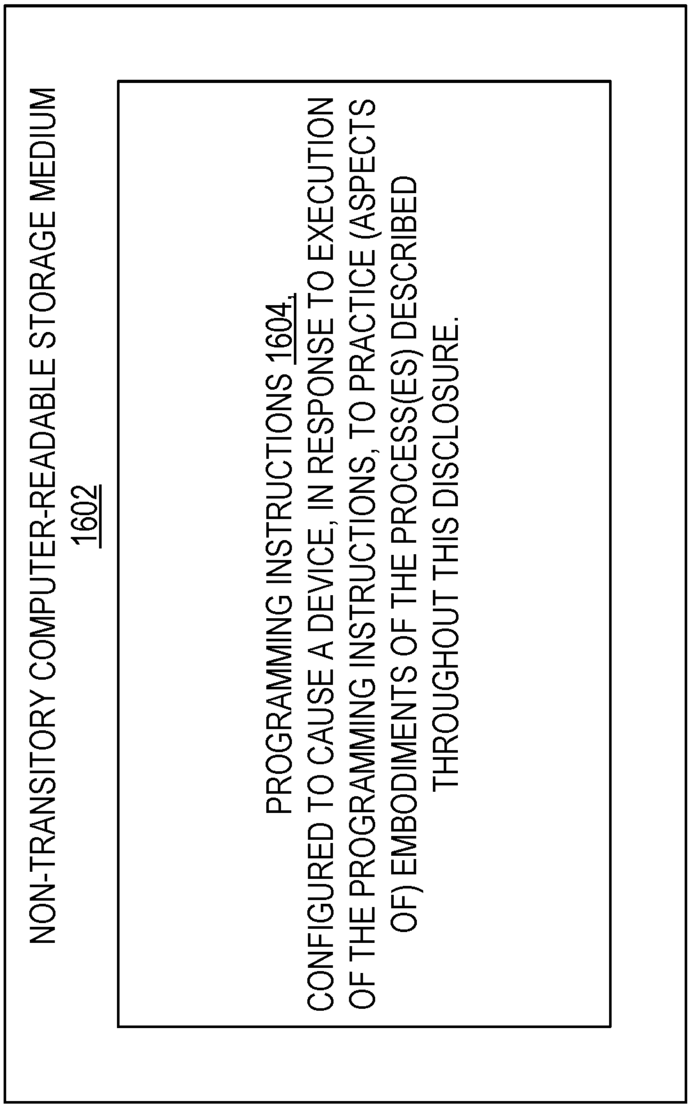
FIG. 7 is a block diagram of a computer-readable storage medium that can be used to implement some of the components of the system or methods disclosed herein, according to various embodiments.

FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) method 400 or 500 described above. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

EXAMPLES

The following examples pertain to further embodiments.

Example 1 is a keyboard, comprising a key; a switch mechanism coupled to the key, the switch mechanism comprised of a spring to return the key to an undepressed position following a key press; and a controller electrically coupled to the spring; wherein a length of the spring controls a height of the key above a substrate when undepressed, and the controller controls the length of the spring to adjust the height of the key between a first height and a second height.

Example 2 includes the subject matter of example 1, or some other example herein, wherein the spring is comprised of a shape memory alloy that can be toggled between a first length and a second length, the first length and second length corresponding to the first height and the second height.

Example 3 includes the subject matter of example 2, or some other example herein, wherein the controller toggles the spring between the first length and the second length.

Example 4 includes the subject matter of example 2 or 3, or some other example herein, wherein the controller heats at least a portion of the spring to toggle the spring between the first length and the second length.

Example 5 includes the subject matter of example 4, or some other example herein, wherein the controller heats the portion of the spring inductively.

Example 6 includes the subject matter of example 4, or some other example herein, wherein the controller heats the portion of the spring using an external heat source.

Example 7 includes the subject matter of any of examples 1-6, or some other example herein, wherein the key is one of a subset of a plurality of keys, individuals of the subset of the plurality of keys adjustable between the first height and the second height; surfaces of the plurality of keys forms a first plane above and parallel to the substrate; surfaces of individuals of the subset of the plurality of keys are within the first plane when their height is the first height; and surfaces of individuals of the subset of the plurality of keys form a second plane that is above the first plane when their height is the second height.

Example 8 includes the subject matter of any of examples 1-7, or some other example herein, further comprising a magnet, and wherein the controller passes a current through the spring in a first direction to cause the magnet to adjust the spring to the first height, and passes a current through the spring in a second direction to cause the magnet to adjust the spring to the second height.

Example 9 is a method, comprising receiving, at a keyboard controller, a signal to switch to a braille interface; causing, by the keyboard controller in response to the signal, a subset of a plurality of keys of a keyboard to increase in height above a plane defined by surfaces of the plurality of keys; and disabling, by the keyboard controller, the remaining keys of the plurality of keys that are not part of the subset.

Example 10 includes the subject matter of example 9, or some other example herein, further comprising receiving, at the keyboard controller, a second signal to switch to a standard interface; causing, by the keyboard controller in response to the second signal, the height of the subset of the plurality of keys to return to level with the plane; and enabling, by the keyboard controller, the remaining keys of the plurality of keys.

Example 11 includes the subject matter of example 9 or 10, or some other example herein, wherein causing the subset of the plurality of keys to increase in height comprises causing, by the keyboard controller, a spring in individuals of the subset to increase in length.

Example 12 includes the subject matter of example 11, or some other example herein, wherein the spring is comprised of a shape memory alloy, and causing the spring in individuals of the subset to increase in length comprises heating the spring.

Example 13 includes the subject matter of example 11 or 12, or some other example herein, wherein causing the spring in individuals of the subset to increase in length comprises passing a current through the spring in a first direction to induce a magnet to push the spring longer; and further comprising causing the spring to decrease in length by passing a current through the spring in a second direction opposite of the first direction to induce the magnet to pull the spring shorter.

Example 14 is a system, comprising a processor; a keyboard controller coupled to the processor; and a keyboard coupled to the keyboard controller, the keyboard comprising a plurality of keys, the keys having surfaces that form a plane above and parallel to a substrate plane, wherein individuals of a subset of the plurality of keys comprises a switch mechanism, the switch mechanism further comprised of an actuator that is adapted to change the height of its associated key between a first height and a second height, the first height being coincident with the plane, and the second height being above the plane, and the keyboard controller is coupled to the actuators of the individual keys of the subset of the plurality of keys to selectively change the height of the individual keys.

Example 15 includes the subject matter of example 14, or some other example herein, wherein the subset of the plurality of keys comprises six (6) keys.

Example 16 includes the subject matter of example 14 or 15, or some other example herein, wherein the subset of the plurality of keys is arranged to form an interface for the entry of braille characters.

Example 17 includes the subject matter of any of examples 14-16, or some other example herein, wherein actuators of the individuals of the subset of the plurality of keys comprise springs, the springs comprised of a shape memory alloy.

Example 18 includes the subject matter of example 17, or some other example herein, wherein the keyboard controller causes the actuators to change between the first height and the second height by heating at least a portion of individuals of the springs.

Example 19 includes the subject matter of example 17 or 18, or some other example herein, wherein the keyboard controller causes the actuators to change to the second height by passing a current through the individuals of the springs in a first direction to cause magnets associated with the individuals of the springs to push the springs away from their associated magnets, and the keyboard controller causes the actuators to change to the first height by passing a current through the individuals of the springs in a second direction opposite to the first direction to cause the magnets to pull the springs towards their associated magnets.

Example 20 includes the subject matter of any of examples 14-19, or some other example herein, wherein the system is a laptop computer.

What is claimed is:

1. A keyboard, comprising:

a key;

a magnet;

a switch mechanism coupled to the key, the switch mechanism comprising a spring to return the key to an undepressed position following a key press; and a controller electrically coupled to the spring, wherein a length of the spring controls a height of the key above a substrate when the key is undepressed, and wherein the controller is configured to adjust the length of the spring to thereby adjust the height of the key between a first height and a second height by (i) providing a current through the spring in a first direction to cause the magnet to adjust the length of the spring to move the key to the first height, and (ii) providing a further current through the spring in a second direction to cause the magnet to adjust the length of the spring to move the key to the second height.

2. The keyboard of claim 1, wherein the spring comprises a shape memory alloy configured to be toggled between a first length and a second length, the first length and the second length corresponding to the first height and the second height, respectively.

3. The keyboard of claim 2, wherein the controller is configured to toggle the spring between the first length and the second length.

4. The keyboard of claim 3, wherein the controller is configured to heat a portion of the spring to toggle the spring between the first length and the second length.

5. The keyboard of claim 4, wherein the controller is configured to heat the portion of the spring inductively.

6. The keyboard of claim 4, wherein the controller is configured to heat the portion of the spring using an external heat source.

7. The keyboard of claim 1, wherein:

the key is part of a subset of keys from among a plurality of keys of the keyboard, individual keys of the subset of keys are configured to be adjustable between the first height and the second height, surfaces of the plurality of keys form a first plane above and parallel to the substrate when the plurality of keys is in an unextended state, surfaces of individual keys of the subset of keys are coplanar with the first plane when a respective key height is the first height, and surfaces of individual keys of the subset of keys are coplanar with a second plane that is above the first plane when a respective key height is the second height.

8. A method, comprising:

receiving, at a keyboard controller, a signal to switch to a braille interface;

causing, by the keyboard controller in response to the signal, a subset of a plurality of keys of a keyboard to increase in height above a plane by providing a current in a first direction through a spring in respective keys of the subset to induce a magnet to lengthen the respective spring;

disabling, by the keyboard controller while operating in the braille interface, the remaining keys of the plurality of keys that are not part of the subset;

receiving, at the keyboard controller, a further signal to switch to a standard interface; and causing, by the keyboard controller in response to the further signal, the subset of the plurality of keys to decrease in height to coincide with the plane by providing a further current in a second direction, that is opposite to the first direction, through the spring in respective keys of the subset to induce the magnet to shorten the respective spring, wherein the plane is defined by surfaces of the plurality of keys when the plurality of keys are in an unextended state.

9. The method of claim 8, further comprising:

enabling, by the keyboard controller, the remaining keys of the plurality of keys.

10. The method of claim 8, wherein the spring in the respective keys of the subset comprises a shape memory alloy, and wherein causing the spring in the respective keys of the subset to increase in length comprises heating the spring in the respective keys.

11. A system, comprising:

a processor;

a keyboard controller coupled to the processor; and a keyboard coupled to the keyboard controller, wherein:

the keyboard comprises a plurality of keys having surfaces that form a plane above and parallel to a substrate plane when the plurality of keys are in an unextended state, individual keys of a subset of keys from among the plurality of keys comprise a switch mechanism, the switch mechanism comprising a spring and an actuator configured to adjust a height of the individual keys between a first height and a second height, the first height being coincident with the plane, and the second height being above the plane, and the keyboard controller is coupled to respective actuators of the individual keys of the subset of keys and configured to selectively adjust the height of the individual keys by:

providing a current through respective springs of the individual keys of the subset of keys in a first direction to cause magnets associated with the respective springs to lengthen the respective springs to adjust the individual keys of the subset of keys to the second height; and providing a further current through the respective springs of the individual keys of the subset of keys in a second direction opposite to the first direction to cause the magnets associated with the respective springs to shorten the respective springs to adjust the individual keys of the subset of keys to the first height.

12. The system of claim 11, wherein the subset of keys comprises six keys.

13. The system of claim 11, wherein the subset of keys is arranged to form an interface for entry of braille characters.

14. The system of claim 11, wherein the respective actuators of the individual keys of the subset of keys include springs comprising a shape memory alloy.

15. The system of claim 14, wherein the keyboard controller is configured to cause the respective actuators of the individual keys of the subset of keys to change between the first height and the second height by heating a portion of respective springs of the individual keys.

16. The system of claim 11, wherein the system is a laptop computer.

* * * * *